United States Patent [19]

Culley et al.

[11] Patent Number: 4,501,471
[45] Date of Patent: Feb. 26, 1985

[54] AUTOMATED LIQUID CRYSTAL DISPLAY AND PROCESS

[75] Inventors: Bobby G. Culley, Wylie; Kishin Surtani, Plano, both of Tex.

[73] Assignee: Texas Instruments Incorporated, Dallas, Tex.

[21] Appl. No.: 344,094

[22] Filed: Jan. 29, 1982

Related U.S. Application Data

[62] Division of Ser. No. 167,909, Jul. 14, 1980, abandoned, which is a division of Ser. No. 43,068, May 29, 1979, Pat. No. 4,228,574.

[51] Int. Cl.³ .............................................. G02F 1/13
[52] U.S. Cl. ................... 350/334; 350/339 R
[58] Field of Search ................... 350/334, 339 R, 344

[56] References Cited

U.S. PATENT DOCUMENTS 3,994,567 11/1976 Matsuo et al. ...................... 350/341

FOREIGN PATENT DOCUMENTS

51-81592 7/1976 Japan .............................. 350/339 R
0033642 3/1978 Japan .............................. 350/344

Primary Examiner—John K. Corbin
Assistant Examiner—Richard Gallivan
Attorney, Agent, or Firm—Melvin Sharp; James T. Comfort; Carlton Hoel

[57] ABSTRACT

A liquid crystal display (LCD) capable of automated fabrication facilitated by the use of continuous strips of plastic film on the surface of which corresponding electrode patterns are defined. Liquid crystal material, and spacing means, are sealed between the plastic strips, preferably with the aid of sealing rings formed on one of the film strips; thereby, defining the individual liquid crystal display.

4 Claims, 9 Drawing Figures

AUTOMATED LIQUID CRYSTAL DISPLAY AND PROCESS

This is a division of application Ser. No. 167,909, filed July 14, 1980, abandoned, which is a division of application Ser. No. 043,068, filed May 29, 1979, now U.S. Pat. No. 4,228,574.

BACKGROUND OF THE INVENTION

This invention relates to displays and more particularly to liquid crystal displays, capable of readily being automated, wherein continuous strips of plastic film are used, operated upon, and formed into liquid crystal display packages.

When properly aligned liquid crystal compositions are materials which exhibit reversible liquid modulation properties under an electric field. Normally the compositions are transparent to light, but in the presence of an electric field they scatter incident light. This characteristic has been extensively discussed in literature and will not be discussed in detail here. Further, exemplary liquid crystal compositions that are responsive to either D.C. or A.C. excitation voltages are well known.

Liquid crystal displays are known to operate in at least two basic modes, namely the reflective and transparent modes. The displays which are the subject of this invention are adaptable to either mode of operation. A reflective mode liquid crystal display device is comprised of a transparent electrode spaced from a second transparent electrode with the space between the two electrodes being filled by a liquid crystal composition. When an electrical bias is placed across these two electrodes the composition is subjected to an electric field which causes it to change its optical characteristics. This causes the contrast of the viewing plane formed by the reflective electrode to change in the region adjacent the portions of the liquid crystal composition which are subjected to the electric field. By shaping at least one of the electrodes to conform to the pattern or a portion of the pattern to be displayed a desired display pattern can be formed.

A transparent mode liquid crystal device consists of two transparent electrodes and a liquid crystal composition positioned therebetween. A light source is placed behind the liquid crystal display and selected regions of the composition are subjected to the influence of an electric field by applying an electric potential between the electrodes. The electric field causes the liquid crystal composition to scatter light. By shaping at least one of the electrodes to conform to a pattern or a portion of a pattern to be displayed the desired pattern can be formed.

Since, as described above the pattern displayed is determined by the shape of one or more electrodes, a liquid crystal display can be tailored to the desired application. Typical displays include the well-known seven segment display used for displaying digits between 0 and 9 as well as the dot display in which the pattern to be displayed is formed on a series of selectively placed dots. The dot type display may be formed by designing both the front and back electrodes of a liquid crystal display to have closely spaced electrically insulated conductors and orienting the front and back electrodes so that the respective conductors are orthogonal. The dot is formed by applying about one half the voltage required to cause the liquid crystal composition to scatter light to each of the electrodes. A dot is formed in region where the two electrodes cross.

Conventional liquid crystal display fabrication utilizes conductively coated and patterned glass. Between the two processed glass pieces a liquid crystal material is introduced, and a sealant is then introduced to enclose the liquid crystal between the processed glass pieces. The glass is processed by means of a photolithographic method to a conductively coated glass piece with selective etching of the conductor areas; applying an alignment layer; and orienting the alignment layer in the orientation necessary to effect a twisted nematic liquid crystal display. A second conductively coated piece of glass is similarly processed with a different electrode pattern and with an alignment layer oriented transverse to the direction of the alignment layer on the first glass piece. The first and second glass pieces are aligned and placed adjacent to and in contact with one another. The liquid crystal material is introduced between them, and a sealant is introduced between the glass pieces so as to trap the liquid crystal material in place. Finally, polarizers are aligned with and adhered to each of the first and second glass surfaces. The problems inherent in conventional liquid crystal display glass fabrication include incompatability with automated processing, necessitating human handling at critical stages of the process. Additionally, photolithographic etching limitations on resolution exists with larger displays on glass.

SUMMARY OF THE INVENTION

One of the ways to lower production costs of liquid crystal displays is to utilize a completely automated fabrication operation, wherein raw materials are automatically fed in as required, and packaged displays are automatically fabricated. Such an operation may be embodied so as to conveniently be able to roll on a reel for storage at any process step. Such a process could also be used to produce large area displays conveniently and at low cost.

An article of manufacture embodying the invention utilizes a flexible strip form for all incoming and interim material in fabricating the liquid crystal displays, so as to conveniently be able to roll it on a reel for storage at any process step. For example, a conductive coating may be applied to a continuous transparent film. Using photolithographic techniques a pattern is formed on the conductive film layer, and selective etching is accomplished to retain only the desired display pattern. A second continuous transparent film is similarly processed with a complementary pattern being selectively retained, the two transparent films being separately processed. A liquid crystal and spacer material is interposed between the first patterned film and the second patterned film and sealed between them. A polarizer layer is bonded to the outer surface of first film and a polarized transflector layer is bonded on the outer surface of the second patterned film. The resultant bonded structure is cut into strips of displays, tested, and further cut into individual liquid crystal display unit modules. By using flexible strip material in continuous form, it may conveniently be rolled into reel form for storage at any step in the fabrication sequence.

BRIEF DESCRIPTION OF THE DRAWINGS

The novel features believed to be characteristic of this invention are set forth in the appended claims; the invention, itself, however, as well as other objects and advantages thereof, may best be understood by refer

DETAILED DESCRIPTION OF THE INVENTION

Figure 1:
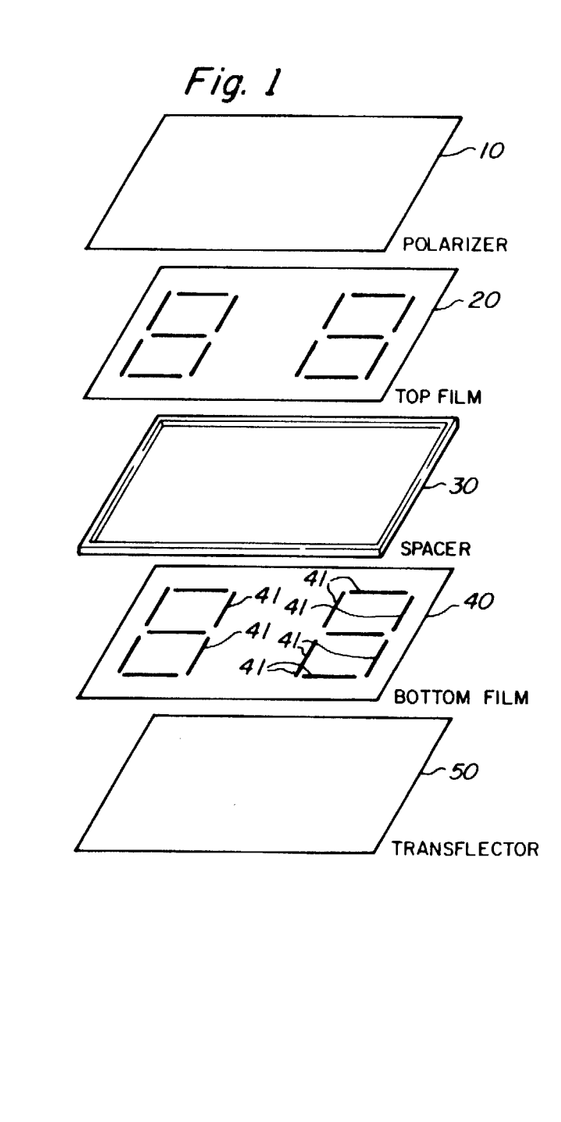
- FIG. 1 is an exploded schematic view of one embodiment of a display device fabricated in accordance with the present invention.

Referring to FIG. 1, an exploded schematic diagram of a liquid crystal display film module fabricated using an embodiment of the present invention is shown. It comprises, as better shown in FIG. 2, a sandwich stack of parallel layers which, in order from the top to bottom, are a polarizer film 10, a top electrode film 20, a spacer frame 30, a bottom electrode film 40, and a polarized transflector film 50. Liquid crystal material is sealed within the volume defined by the spacer frame 30. The top and bottom electrode films 20 and 40 have patterned thereon segments 41 corresponding to the desired display pattern.

Figure 2:
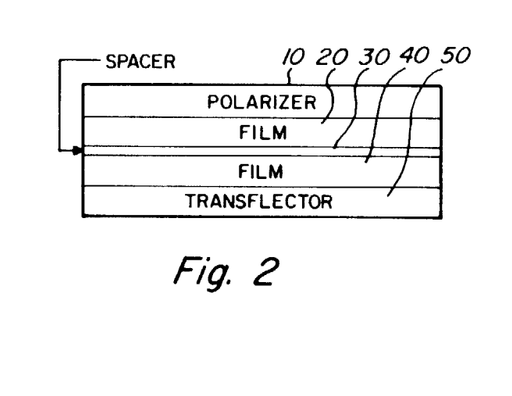
FIG. 2 is a side view of the display assembly shown in FIG. 1.

Referring to FIG. 2, a side view of the liquid crystal display module of FIG. 1 is shown with the subelements of the module in a preferred embodiment. Typical dimensions of a three and one half digit watch liquid crystal display film module are lengths of 0.850 inches (21.59 mm), width 0.55 inches (13.97 mm), and thickness of 0.020 inches (0.508 mm), without the polarizers. Typical thicknesses for the polarizer 10 and polarized transflector 50 subelements are 0.008 inches (0.203 mm), for the top film 20 and bottom film 40 are 0.007 inches (0.177 mm), and for the spacer 30 is 10 microns (10 micrometers).

Figure 3:
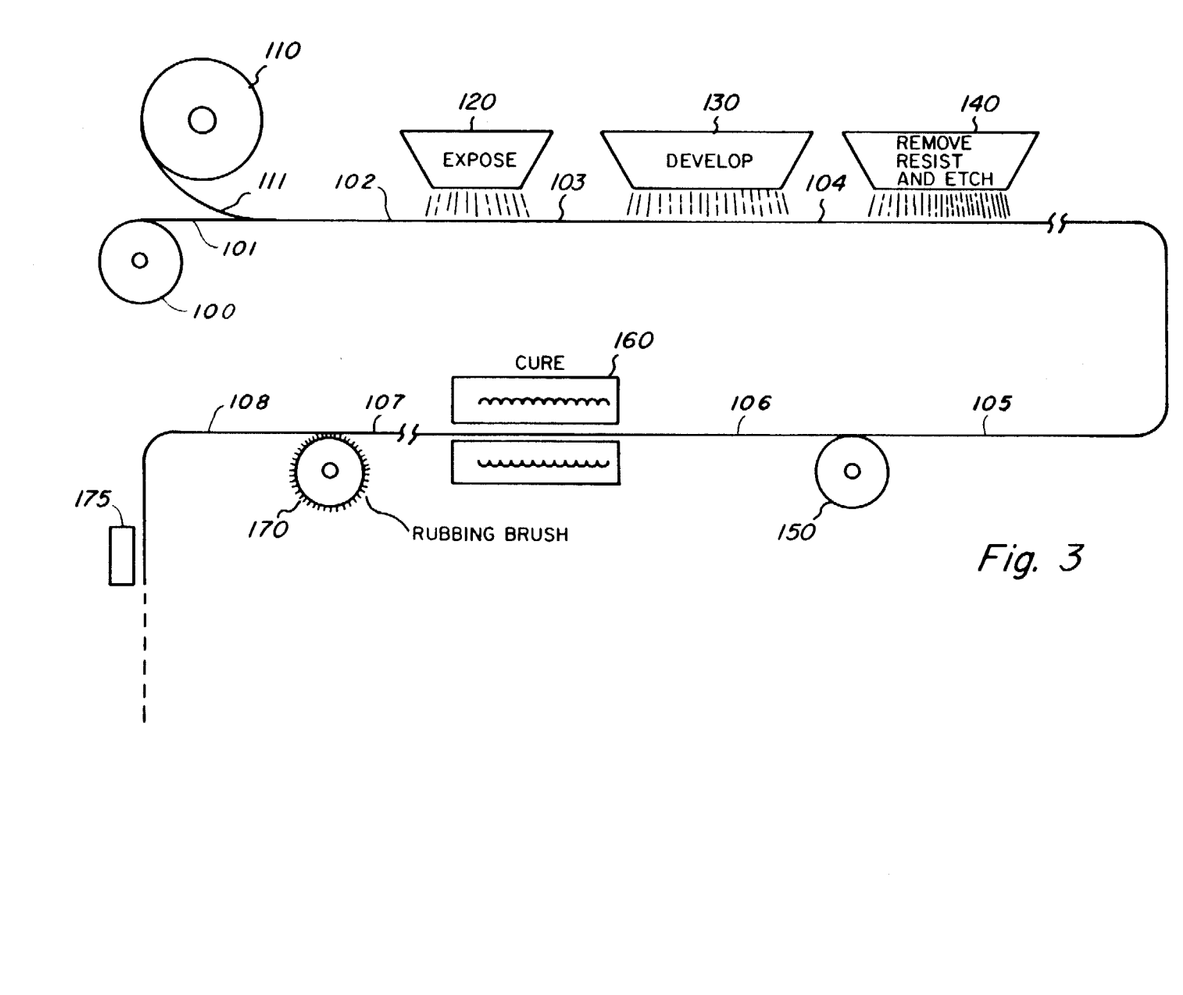
FIG. 3 is a partially schematic process flow diagram of a preferred method for producing a conductively coated patterned film for use in the present invention.

Referring to FIG. 3, a preferred embodiment of producing the present invention of FIG. 1 and 2 is shown. A reel 100 dispenses a film into the input of the automated LCD film fabrication processing. The film 101 is comprised of a continuous strip of transparent film. Optically clear films such as mylar, polyethelene, triphtalate, poly-carbonate, poly-vinylchloride, cellulose, triacetate, etc., could be used in this process. Each film material has its own advantages and disadvantages which must be balanced with production costs and fabrication compatibility. Ideally, the film should be isotropic, such as cellulose acetate butarate (CAB). However, this material is chemically very unstable, and is attacked by most organic solvents, acids and bases. It is however, conceivable to use CAB type films with some protective coatings which are chemically inert and electrically insulating. In general, the thickness of the film used may be varied from 0.001 inch (0.0254 mm) to 0.050 inch (1.27 mm), though based upon material and process limitations, application, and cost standpoints, a thickness in the range from 0.004 inch (0.1026 mm) to 0.010 (0.254 mm) would appear optimum. Transparency of typical films is greater than 90%. However, films of lower transparency may also be used. A transparent conductive coating covers the film 101. The transparent conductive coating, for example, indium oxide or cadmium stanate, is sputtered or evaporated onto the continuous film. It is important that the film should withstand the heat of evaporation and should not evolve any material to contaminate the evaporation or sputtering system. For these reasons, films containing excessive amounts of plasticizers are not generally recommended for use. A coating of a minimum thickness of 400 Angstroms and a resistivity of approximately 500 ohms/square (ohms per square area of surface) is typically used. Excessive thickness of this coating affects the transparency of the resultant coated film and an optimization must be made between required transparency and resistivity. The incoming film 101, may suitably be in a roll having a width in the range of 12 inches (304.8 mm) to 36 inches (914.4 mm). To facilitate convenient handling of the near continuous film 101, as well as make possible the use of standard manufacturing and processing equipment, the roll of film should be slit to a width of 35 mm (1.378 inches) or 70 mm (2.756 inches) or to any other desired sizes. Presently available slitting machines and punch dies may be used to facilitate processing of the film 101 through an automated assembly line (for example, in the embodiments set forth in FIGS. 3, 4, or 5). FIG. 6 shows a section of cut and punched film 500. Punch holes 501 provide for feed guidance in the automated assembly line processing of the film.

Returning to FIG. 3, a film 111 is fed from a reel 110 into the automated assembly process for contact with the film 101. The film 111 is a photoresist material in a film form, but other convenient manners of applying a photoresist material to the film 101 are acceptable. The choice of photoresist material would depend upon the resolution required by the pattern geometry of the conductive electrodes to be formed, and the chemical inertness of the film 101 utilized. Either a positive or negative photo-resist may be used. The photoresist 111 may be comprised of indium oxide, cadmium stanate, Dupont Riston, etc. The resist 111 is fed into face to face contact with the conductive coating on the film 101, and is applied thereto so as to uniformly cover the film 101 with the photoresist 111. A resultant film compound 102 is then fed through an automated assembly line, for example by means of guide fingers extending up through punch guide holes such as guide holes 501 in film 500 of FIG. 6, and is fed to a pattern exposure station 120. Exposure station 120 is periodically enabled so as to expose the film 102 as it passes through to a patterned light energy field which exposes the photoresist film 111 of the compound film 102. The light pattern emitted from station 120 corresponds to the desired electrode graphical pattern to be formed from the conductive coating of film 101 of the compound film 102. The resultant exposed compound film 103 is fed forward through photoresist development station 130.

Station 130 chemically activates regions of the photoresist film corresponding to the electrode pattern into a hardened material (for positive photoresist) impervious to an etchant solution to be used in subsequent processing steps. The hardened photoresist film compound 104 is fed forward to a conductor etching and photo resist removal station 140. The station 140 removes the non-hardened photoresist from film 104 by means of a chemical etchant in a controlled environment so as to remove the conductive coating from the surface areas of film 101 of compound film 104 which does not have a hardened photoresist protective surface layer upon it. Etching of the conductor layer may be done at room temperature in 50% HCL for 10 to 20 seconds. In most cases, depending upon the film 101 used, there may be a preferential orientation of the pattern for etching. A film compound 105, emerging from the station 140, now includes the desired electrode pattern formed of the conductive coating on the transparent film 101. Film 105 is fed forward so as to pass through a roller coat blocking layer station 150. A roller coat blocking layer may be applied by one of a number of methods, wherein a film is deposited of a material which will be formed into an alignment layer. Many types of material may be used for this purpose. A polymer coating, such as polyvinyl alcohol, which is compatible with the automated film deposit process may be used. A resultant film compound 106 has the polymer layer deposited on it and is fed from the station 150 to a station 160 where the deposited alignment layer is cured and fixed. The curing process may be comprised of exposing the deposited polymer layer to an energy source such as infrared or thermal heating. A cured film compound 107 is then fed from station 160 to a station 170, where a rubbing brush or other method of rubbing in a single direction is used to physically align the molecules of the cured polymer layer to form a rubbed alignment layer on a compound film 108. Alternately, $SiO_2$ deposition techniques may be used to form an oriented alignment layer without rubbing.

Figure 4:
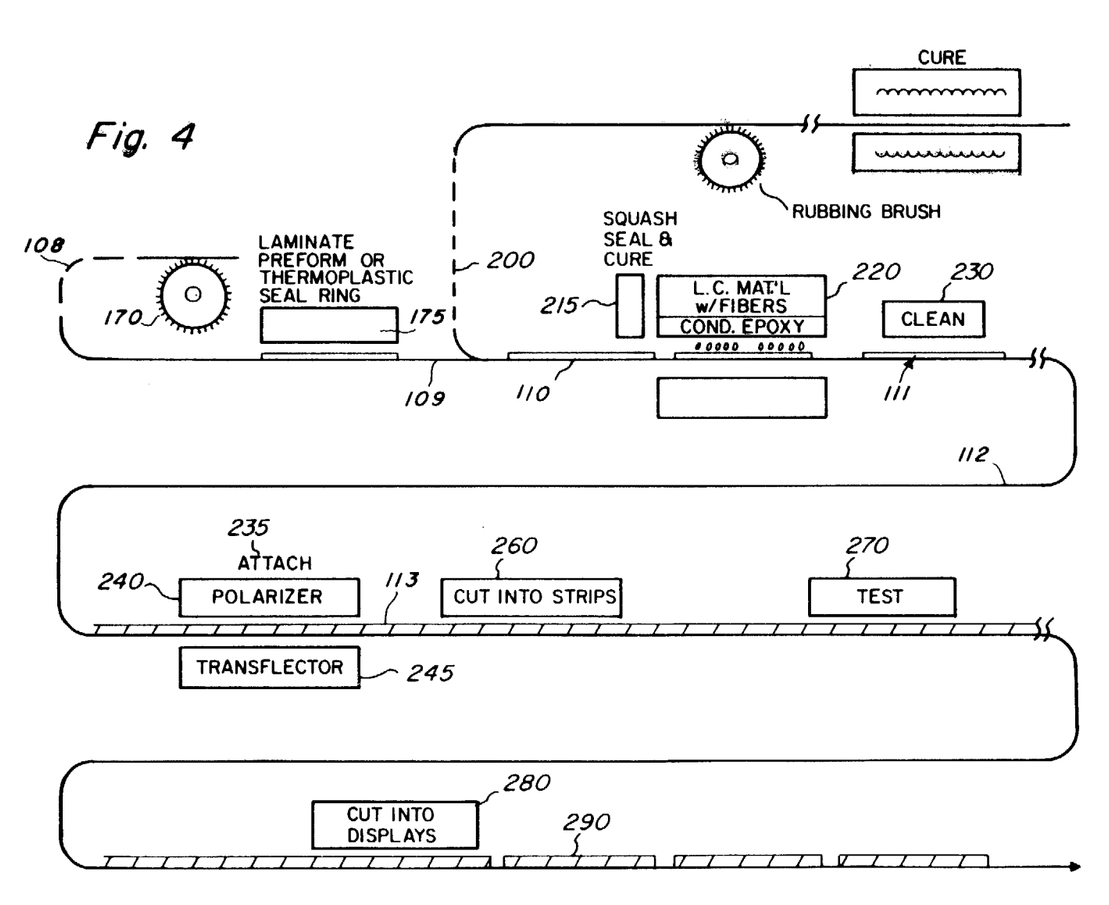
FIG. 4 is a partially schematic process flow diagram illustrating the continuance of the process flow of the preferred embodiment as shown in FIG. 3, inputting the conductively coated patterned film from FIG. 3, and processing said film so as to create individual display modules.
Figures 5, 5B, 6:
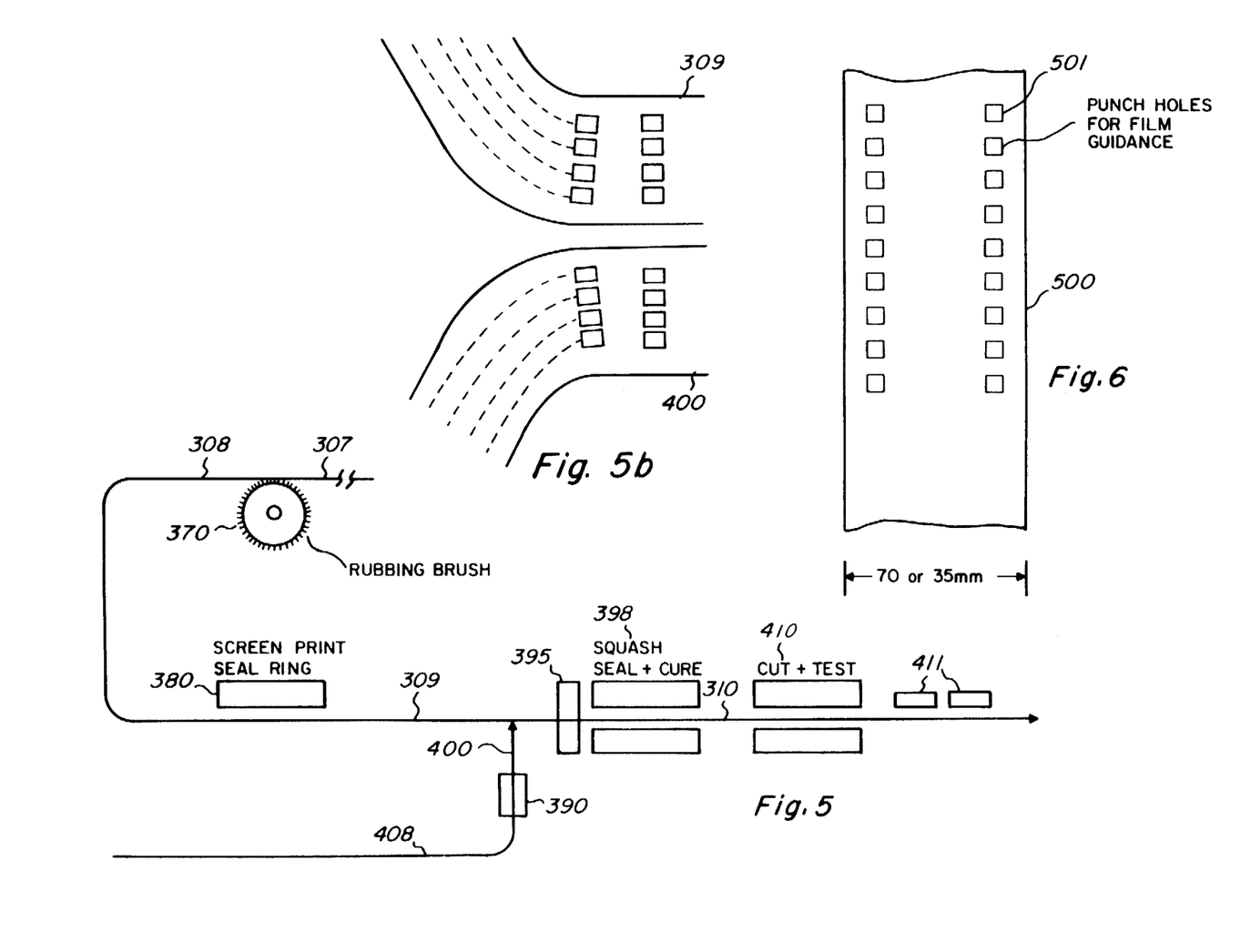
FIG. 5 is a partially schematic process flow diagram of another embodiment of the invention for fabricating LCD display modules.
FIG. 5b is a top view of each of the film strips as utilized in the present invention shown at a point in the process subsequent to electrode patterning.
FIG. 6 is a top view of a film used in a preferred embodiment of the invention.

Referring to FIG. 4, the film 108 is fed to an adhesive application station 175, where an adhesive pattern of seal rings is applied to the film 108, each seal ring surrounding an electrode pattern on the film 108. Laminate preforms, thermoplastic seal rings, or other type adhesive or epoxy may be utilized to form the adhesive pattern. In a preferred embodiment of the invention, the pattern may be printed onto the film 108. However any other method of forming an adhesive pattern on the film 108 may be used which is compatible with an automated sealing process. A film 109 emerging from station 175 is combined with a second film 200, the bottom film in a preferred embodiment. The film 200 is processed in a manner similar to film 108. Film 200 is a conductively coated, etched, and alignment layer rubbed film similarly processed to film 108 but with a different pattern complementary to the pattern of film 108 and with the alignment layer oriented transversely to the alignment layer orientation of film 108 when the two films are brought adjacent each other with the electrode patterns on each of the film strips facing each other. The film 109 and the film 200 are brought adjacent each other with the electrode patterns on each of the film strips facing each other such that the respective electrode patterns on film 109 are opposite to corresponding electrode patterns on film 200, to define pairs of corresponding electrode patterns. The film 109 and the film 200 are then fed to a station 215 where the two films are sealed together to form a film compound 110. The combined film structure 110 is fed forward to station 220 where a liquid crystal material with fiber spacers is introduced between the top and bottom films. Additionally, in a preferred embodiment a conductive epoxy is introduced between the top film and the bottom film within the confines of the seal, to form an electrical connection between a contact of the bottom electrode pattern to a contact of the top electrode pattern. The liquid crystal material may be for a twisted nematic display, dye display, dynamic scattering display, sematic liquid crystal display, etc.

The film compound 110 with liquid crystal material and spacing means interposed between film 109 and 200 is then sealed to form a plurality of liquid crystal display units 111. The film compound 112 containing the liquid crystal display units 111 is fed to station 230 where the film compound 112 is cleaned to prepare for the attachment of a polarizer and a transflector. The film compound 112 is fed to station 235 where a polarizer 240 is attached to the film strip 109 of each display unit 111 in parallel alignment with film strip 109, and a transflector 245 is attched to the film strip 200 of each display unit 111 in parallel alignment with the film strip 200 to form liquid crystal display unit cell 113. The polarization directions of the polarizer 240 and transflector 245 may be in parallel or transverse alignment with the polarization direction of the alignment layers of film strips 109 and 200, respectively when attached to form cell 113. The polarizer 240 and transflector 245 may be film strips of polarizer material, or alternately may be other forms of polarizer material compatible with automated processing of near continuous film strips.

In a preferred embodiment, the resultant film cells 113 are fed to station 260 where the individual liquid crystal display unit with polarizer and transflector attached may be cut into parallel individual strips, each containing multiple cells 113 in parallel alignment. The cut strips are fed to station 270 where the liquid crystal display unit cells 113 are individually tested for functionality, and failed units are marked accordingly, such as by depositing an ink spot on the cell. The cut and tested strips are then fed to station 280 where each individual liquid crystal display unit cell 113 is cut into a separate module 290, which is the finished liquid crystal display module as depicted in FIG. 1.

Referring to FIG. 5, a preferred embodiment of the present invention is shown. A compound film 308, processed in an identical manner as the compound film 107 of FIG. 3, is fed to an adhesive application station 380 where a ring of adhesive is applied to the compound film 308 to form a compound film 309. For example, a seal ring may be printed upon the patterned surface of the compound film strip 308 to bond the compound film 309 to a second similarly processed compound film strip 400.

Alternately, other methods of precision adhesive application to the compound film 308 may be used at the station 380. The compound film strip 309 emerging therefrom is brought adjacent to the compound film strip 400, with the electrode patterns on the two strips, 309 and 400, facing each other such that the electrode patterns of the film strip 309 are positioned opposite respectively corresponding electrode patterns on the film strip 400 to define pairs of corresponding electrode patterns. In a preferred embodiment, as shown in FIG. 5B, the pairs of corresponding conductive electrode patterns are formed in rows across and columns along the length of each of the film strips 309 and 400, such that multiple rows of liquid crystal display units will be formed along the length of the film 309 and 400 when they are sealed.

The film strip 400 is comprised of a film processed in a manner similar to the film 308. However, the etched conductive pattern of the film 400 is complementary to the etched conductive pattern of film 308. A film 408, similarly processed to film 308 except for the use of a different, complementary, exposure pattern is fed to a dispenser station 390, where liquid crystal material with spacer fibers is formed, for example, deposited, onto the conductively patterned surface of the film 408, to form the compound film 400. The film 400 is combined with the film 309 in the manner previously described, and fed to a station 395. If connection between the electrode patterns of the top and bottom films 309 and 400 is required, then a conductive epoxy is introduced at this point between the films. A resulting compound film is fed to station 398, where it is placed under pressure and is exposed to a curing process, such as described with respect to FIG. 3 station 160, for example, by heat and pressure, to form a plurality of liquid crystal display modules. A resultant film compound 310 is then fed to station 410, where the liquid crystal display unit cell modules 401 are cut into individual modules, which are tested, and marked accordingly, such as described with respect to the test station 270 of FIG. 4, to form the finished product individual liquid crystal display unit modules 411, in the form of stacked layers as depicted in FIG. 2.

Figure 7:
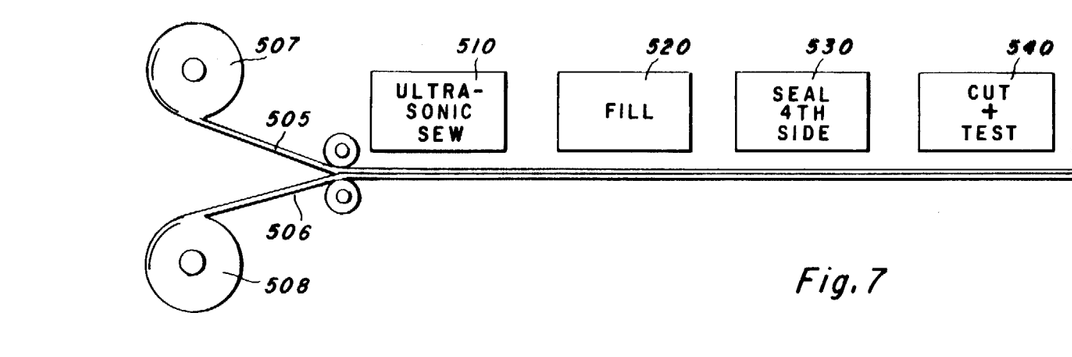
FIGS. 7 and 8 are partially schematic process flow diagrams of alternate embodiments of the sub-process of sealing and filling the liquid crystal display modules.

Referring to FIG. 7, a partially schematic process flow diagram of another embodiment of the sub-process of sealing and filling with liquid crystal material the LCD modules is shown. A compound film 505, processed identically to the film 309 of FIG. 5, is fed from reel 507 to station 510, where the film 505 is combined with a second film 506, the film 506 being identically processed to the film 408 of FIG. 5, film 506 feeding from reel 508. The film 505 and the film 506 are brought adjacent to each other with the electrode patterns on each of the film strips facing each other such that the respective electrode patterns on film 505 are opposite to corresponding electrode patterns of film 506, to define pairs of corresponding electrode patterns. The adjacent films 505 and 505 are fed to station 510 where three sides of the electrode patterned pair is ultrasonically sewn together. The resultant sewn film compund is fed to station 520, where liquid crystal material is introduced into the one edge which was not sewn and the filled compound film is then fed to station 530, where the non-sewn edge is sealed, such as by epoxy. The resultant compound film contains multiple liquid crystal display modules defined by each sealed electrode pair, and this resultant film is fed forward to station 540 where each individual sealed electrode pair is cut into an individual liquid crystal display unit module, and the individual unit modules are tested.

Figure 8:
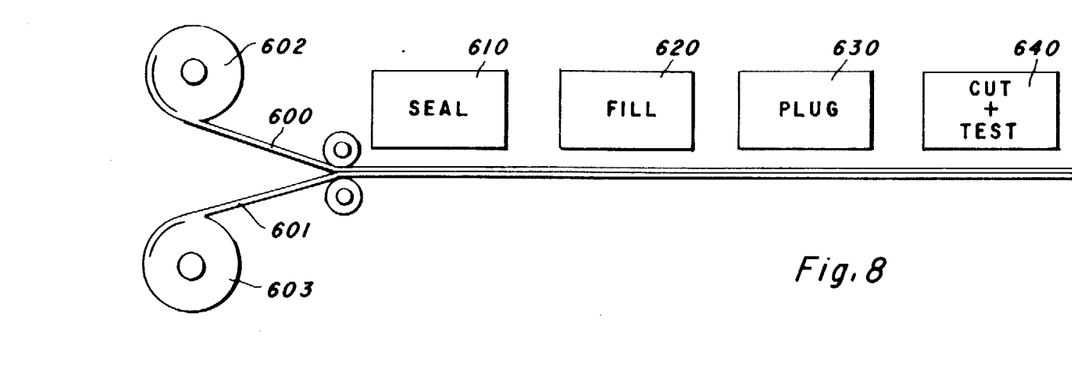

Referring to FIG. 8, a film 600, identical to the film 505 of FIG. 7, is fed from a reel 602, and is brought adjacent to a film 601, the film 601 being identical to the film 506 of FIG. 7, the film 601 feeding from the reel 603. The film 600 and the film 601 are brought adjacent to each other with the electrode patterns on each of the film strips facing each other such that the respective electrode patterns on film 600 are opposite to corresponding electrode patterns on film 601, to define pairs of corresponding electrode patterns. The adjacent films 600 and 601 are then fed to station 610 where each electrode pattern pair is completely sealed, for example, using epoxy, except that two fill-in holes are provided in the film 600 or in the film 601. The resultant compound film is fed to station 620 where a liquid crystal material, and spacer fibers if required, are introduced via the fill-in holes into the sealed electrode pair. The resultant film compound is fed to station 630 where the fill-in holes are sealed, such as with epoxy. The resultant film compound contains a plurality of liquid crystal display unit modules, which are fed to station 640, where each individual liquid crystal display unit module is cut and tested as described above.

Having described the invention in connection with certain specific embodiments thereof, it is to be understood that further modification may now suggest themselves to those skilled in the art and that it is intended to cover such modifications as fall within the scope of the appended claims.

What is claimed is:

1. A liquid crystal display unit comprising:
   (a) conductive electrode patterns on surfaces of first and second elongated strips of flexible transparent insulating film;
   (b) an alignment layer on each of the patterned surfaces of said first and second film strips;
   (c) said film strips oriented adjacent to each other with said electrode patterns on said two strips facing each other so that the electrode pattern on one strip is positioned opposite the corresponding electrode pattern on the other strip, to define pairs of corresponding electrode patterns;
   (d) liquid crystal material and spacers between said two filmstrips and forming seals between said filmstrips so that said liquid crystal material is enclosed in volumes between said corresponding pairs of electrode patterns on said two filmstrips, in each enclosed volume said two filmstrips being separated by a predetermined distance defined by said spacers; and
   (e) guidance means to facilitate automated handling on said first and second filmstrips.

2. A liquid crystal display of claim 1, wherein;
   (a) said guidance means are formed as parallel rows of aperatures spaced by 35 millimeters or 70 millimeters, to facilitate production handling by automated film transport equipment.

3. A liquid crystal display comprising:
   (a) an electrode pattern on the surfaces of first and second elongated strips of transparent, insulating film;
   (b) an alignment layer on the patterned surface of each of the said first and second filmstrips;
   (c) seal rings surrounding said electrode pattern upon the surface of said first filmstrip;
   (d) a liquid crystal material; spacing means for positioning said liquid crystal material upon the pattern surface of said second filmstrip;
   (e) means for the filmstrips to be adjacent to each other so that the electrode patterns on the two strips are facing each other such that the respective electrode patterns on one strip are positioned opposite the corresponding electrode patterns on the other strip to define pairs of corresponding electrode patterns with the seal rings enclosing said liquid crystal material;
   (f) means for sealing said second filmstrip to said sealing rings on said first filmstrip such that said liquid crystal material is enclosed in a volume between said corresponding pair of electrode patterns so that said liquid crystal display is formed from the two filmstrips, in each enclosed volume the two filmstrips being separated a predetermined distance by said spacing means; and (g) said first and second filmstrips having guidance means for facilitating automated handling.

4. A liquid crystal display of claim 3, wherein:
(a) said guidance means comprises parallel rows of aperatures on 35 mm or 70 mm wide first and second filmstrips, whereby production handling by automated film transport equipment is facilitated.

* * * * *